(12) United States Patent
Marek

(10) Patent No.: US 6,996,209 B2
(45) Date of Patent: Feb. 7, 2006

(54) SCINTILLATOR COATINGS HAVING BARRIER PROTECTION, LIGHT TRANSMISSION, AND LIGHT REFLECTION PROPERTIES

(75) Inventor: Henry Samuel Marek, Clifton Park, NY (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 51 days.

(21) Appl. No.: 10/694,271

(22) Filed: Oct. 27, 2003

(65) Prior Publication Data

US 2005/0089142 A1   Apr. 28, 2005

(51) Int. Cl.
H05G 1/64 (2006.01)
(52) U.S. Cl. .................. 378/98.8; 250/370.11
(58) Field of Classification Search ............. 378/98.8; 250/370.11, 368
See application file for complete search history.

(56) References Cited

U.S. PATENT DOCUMENTS

| | | | |
|---|---|---|---|
| 4,980,561 A * | 12/1990 | Vieux et al. ............ | 250/486.1 |
| 5,686,733 A | 11/1997 | Fallone et al. | |
| 6,262,422 B1 * | 7/2001 | Homme et al. ........ | 250/370.11 |
| 6,278,118 B1 | 8/2001 | Homme et al. | |
| 6,414,315 B1 | 7/2002 | Wei et al. | |

* cited by examiner

Primary Examiner—Craig E. Church
Assistant Examiner—Jurie Yun
(74) Attorney, Agent, or Firm—Dougherty Clements; Christopher L. Bernard; Peter J. Vogel

(57) ABSTRACT

Scintillator coatings having predetermined barrier protection, light transmission, and light reflection properties are described. These scintillators comprise: a scintillator material comprising a barrier coating disposed thereon, wherein the barrier coating: (1) provides barrier protection to the scintillator material, (2) is capable of transmitting light therethrough, and (3) is capable of reflecting light back into the scintillator material. The barrier coating may comprise a material that has been modified to have light transmissive and reflective properties in addition to protective properties, or it may comprise a protective material and a reflective material that have been co-deposited onto the scintillator material. The barrier coating is a single coating overlying the scintillator material in a substantially conformal manner.

22 Claims, 3 Drawing Sheets

SCINTILLATOR COATINGS HAVING BARRIER PROTECTION, LIGHT TRANSMISSION, AND LIGHT REFLECTION PROPERTIES

FIELD OF THE INVENTION

The present invention relates generally to radiation imaging. More specifically, the present invention relates to scintillators with coatings having barrier protection, light transmission, and light reflection properties, wherein the scintillators are useful for radiation imaging.

BACKGROUND OF THE INVENTION

With applications ranging from diagnostic procedures to radiation therapy, the importance of high-performance medical imaging is immeasurable. As such, new advanced medical imaging technologies continue to be developed. Some such imaging systems utilize amorphous silicon flat panel x-ray detectors.

Generally, in amorphous silicon flat panel x-ray detectors, an amorphous silicon array is disposed on a glass substrate, and a scintillator is disposed over, and is optically coupled to, the amorphous silicon array. An x-ray source emits a beam of x-rays towards the scintillator, which absorbs the x-ray photons and converts them to visible light. The amorphous silicon array then detects the visible light and converts it into electrical charge. The electrical charge at each pixel on the amorphous silicon array is read out digitally by low-noise electronics, and is then sent to an image processor. Thereafter, the image is displayed on a display, and may also be stored in memory for later retrieval.

Scintillators generally comprise materials that are matched to the type of radiation being used. Cesium iodide is one typical material that medical radiation imaging scintillators may comprise. Cesium iodide is an inorganic compound that is grown on the device, in the form of needles, by chemical vapor deposition. Cesium iodide is a hygroscopic, air sensitive, oxidizing material, and therefore, requires a protective barrier coating thereon to prevent the cesium iodide from deteriorating upon contact with ambient conditions. Typically, this protective barrier coating comprises a transparent non-reflective material, such as, for example, Parylene-N, Parylene-C, or Parylene-D. Additionally, a reflective layer is also generally required on top of the coated cesium iodide needles, to improve the light reflection and/or light conducting properties of the cesium iodide needles, and to reflect the light back into the needles and prevent it from scattering out therefrom, thereby improving the device performance. Typically, this reflective layer comprises a sheet of material, such as Opticlad; a white colored, highly reflective plastic material that is placed on top of the coated cesium iodide layer.

Since existing scintillators require both a protective barrier coating and a reflective layer of some sort, it would be desirable to have protective barrier coatings that are also reflective coatings, so that a single coating or layer could be used as both a protector and a reflector. It would also be desirable to co-deposit a protective barrier coating and a reflective coating at the same time, so as to minimize the number of processing steps that are required to manufacture the scintillators, thereby resulting in a single coating or layer that acts as both a protector and a reflector.

SUMMARY OF THE INVENTION

Accordingly, the above-identified shortcomings of existing scintillators are overcome by embodiments of the present invention, which relates to scintillators that have coatings having combination barrier protection, light transmission, and light reflection properties, wherein the scintillators are useful for radiation imaging. Embodiments of this invention allow a single coating layer to act as both a protective barrier layer and a light transmissive and reflective layer so as to minimize the number of processing steps that are required to manufacture the scintillators. Embodiments of this invention reduce light scattering along the scintillator needles, thereby improving the device's performance.

Embodiments of this invention comprise scintillators. These scintillators comprise: a scintillator material comprising a barrier coating disposed thereon, wherein the barrier coating: (1) provides barrier protection to the scintillator material, (2) is capable of transmitting light therethrough, and (3) is capable of reflecting light back into the scintillator material. These coatings protect the scintillator from ambient conditions, transmit light therethrough, and reflect light back into the scintillator.

These coatings may comprise a material that has been modified to have light transmissive and reflective properties in addition to protective properties, such as Parylene (i.e., Parylene-N, Parylene-C or Parylene-D), or it may comprise a protective material and a reflective material that have been co-deposited onto the scintillator material. The reflective material may comprise any light reflective material that can be co-deposited with Parylene or one of its derivatives, such as for example, a metal, a metal compound, a metal oxide, or a metal halide.

The scintillator material may comprise: cesium iodide, cesium iodide doped with thallium, cesium iodide doped with sodium, sodium iodide, sodium iodide dope with thallium, lithium iodide, lithium iodide doped with europium, zinc sulphide, zinc sulphide doped with silver, calcium fluoride, calcium fluoride doped with europium, bismuth germinate, cesium fluoride, anthracene, stelbene, and/or a silicate glass containing lithium activated with cerium.

These coatings comprise a single coating that overlies the scintillator material in a substantially conformal manner, both on top of the needles and around the sides or edges of the needles.

These coatings may be applied to the scintillators in any suitable manner, such as for example, by chemical vapor deposition, metal organic chemical vapor deposition, thermal evaporation, electron beam evaporation, molecular beam evaporation, and/or sputtering.

These scintillators may be used for medical imaging, nondestructive testing of parts, and/or detecting contraband.

Embodiments of this invention also comprise radiation imaging systems. These systems comprise: an x-ray source; an x-ray detector comprising: a scintillator comprising: a scintillator material comprising a barrier coating disposed thereon, wherein the barrier coating: (1) provides barrier protection to the scintillator material, (2) is capable of transmitting light therethrough, and (3) is capable of reflecting light back into the scintillator material; and an amorphous silicon array optically coupled to the scintillator; wherein the x-ray source is capable of projecting a beam of x-rays towards the x-ray detector, the x-ray detector is capable of detecting the x-rays, and an image can be created therefrom.

Embodiments of this invention also comprise methods for making a scintillator having a barrier coating thereon that has both protective properties and light reflective and light transmissive properties. These methods comprise: disposing an amorphous silicon array on a detector substrate; disposing a scintillator material on the amorphous silicon array; forming a barrier coating on the scintillator material; wherein the barrier coating: (1) provides barrier protection to the scintillator material, (2) is capable of transmitting light therethrough, and (3) is capable of reflecting light back into the scintillator material. Disposing the scintillator material on the amorphous silicon array may comprise growing the scintillator material directly on the amorphous silicon array in a substantially conformal manner.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

Figure 1:
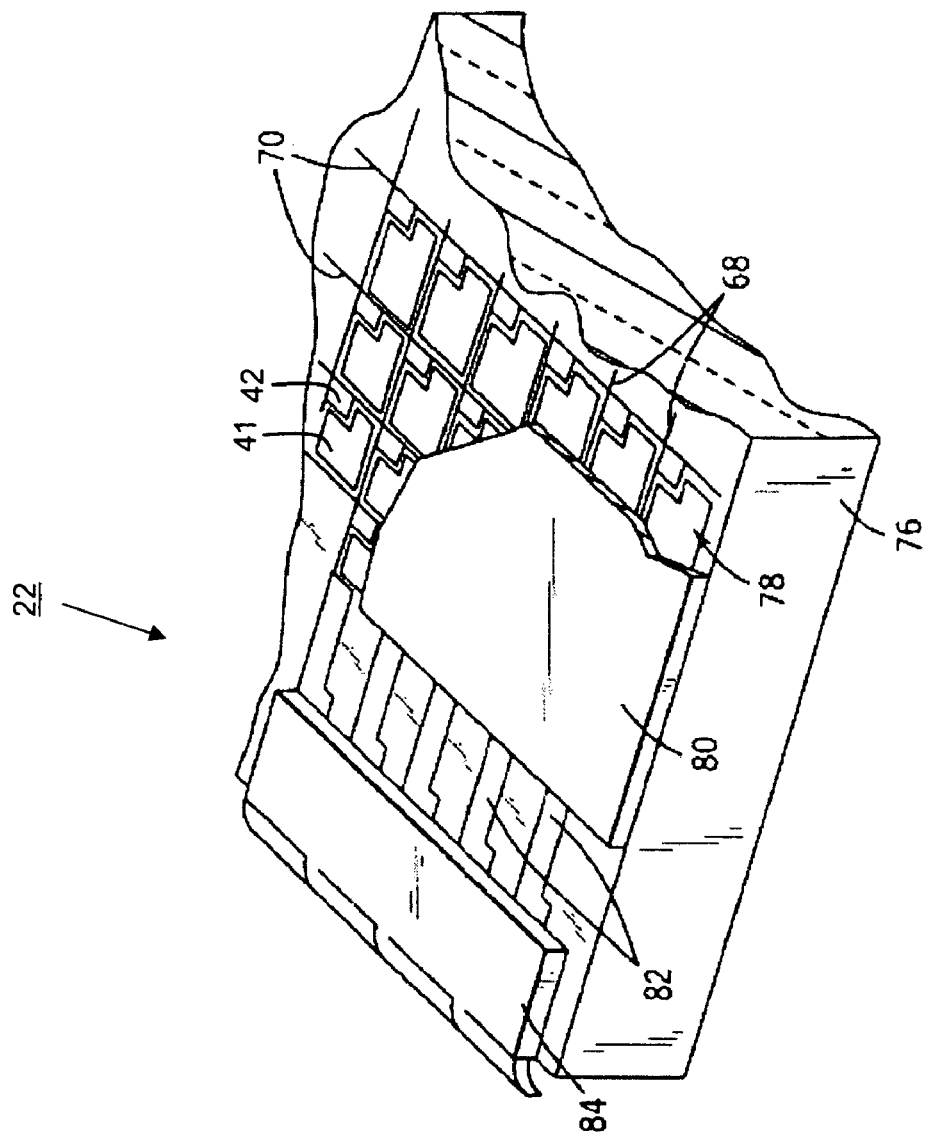
FIG. 1 is a schematic diagram showing the components of a single piece amorphous silicon flat panel, as utilized in embodiments of this invention.
Figure 2:
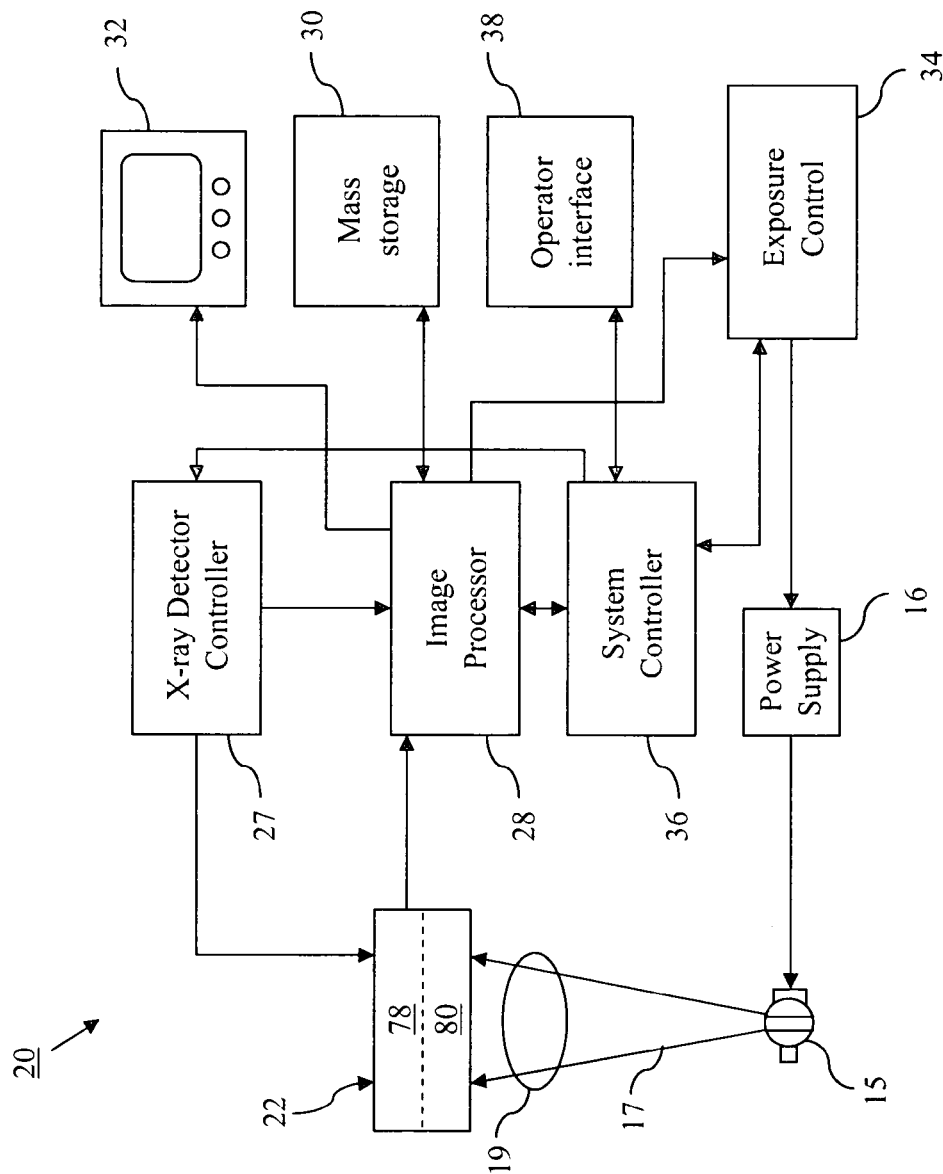
FIG. 2 is a schematic diagram showing the architecture of an x-ray system, as utilized in embodiments of this invention.
Figure 3:
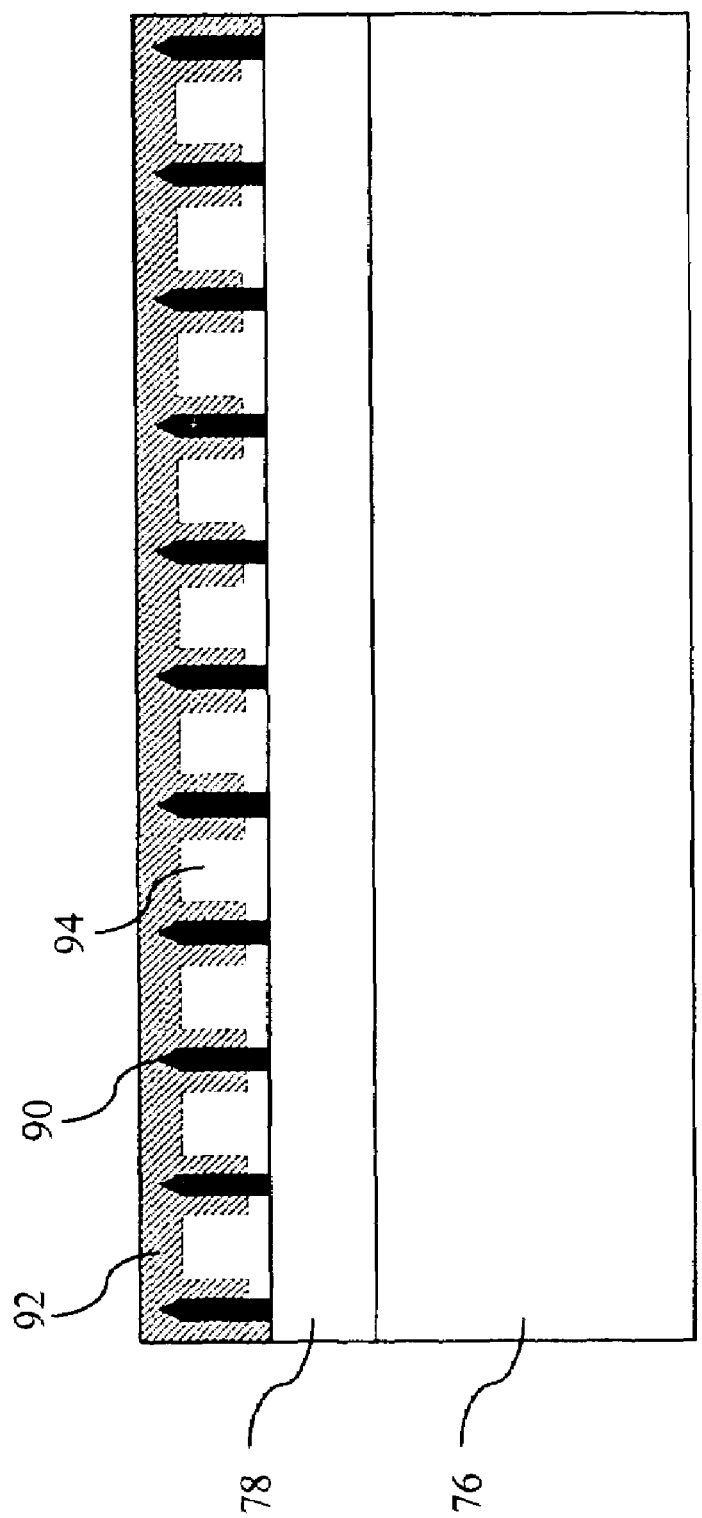
FIG. 3 is a schematic drawing showing cesium iodide needles coated with a protective/reflective coating, as utilized in embodiments of this invention.

For the purposes of promoting an understanding of the invention, reference will now be made to some preferred embodiments of the present invention as illustrated in FIGS. 1–3 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention.

This invention relates to scintillators that have a coating thereon, wherein the coating acts as both a protective barrier layer and as a light reflective layer. This coating may comprise a protective barrier coating that has been modified to also be a reflective coating, or it may comprise simultaneously co-depositing a protective barrier coating with a reflective coating, thereby minimizing the number of processing steps that are required to manufacture the scintillators. These scintillators may be used in radiation imaging in, for example, amorphous silicon flat panel x-ray detectors.

Referring now to FIG. 1, there is shown an exemplary amorphous silicon flat panel x-ray detector 22, as utilized in embodiments of this invention. Generally, column electrodes 68 and row electrodes 70 are disposed on a single piece glass substrate 76, and an amorphous silicon array 78 is defined thereby. The amorphous silicon array 78 comprises an array of photodiodes 41 and field effect transistors (FETs) 42. A scintillator 80 is disposed over the amorphous silicon array 78, and is optically coupled thereto. The scintillator 80, which may comprise a dose-efficient cesium iodide scintillator, receives and absorbs x-ray radiation during operation, and converts the x-ray photons therein to visible light. The high fill factor amorphous silicon array 78, wherein each photodiode 41 therein represents a pixel, converts the detected visible light into an electrical charge. The charge at each pixel is then read out digitally by low-noise electronics (via contact fingers 82 and contact leads 84), and is thereafter sent to an image processor 28.

Referring now to FIG. 2, there is shown a schematic diagram showing the architecture of an x-ray system 20, as utilized in embodiments of this invention. The x-ray system 20 generally comprises an x-ray source 15, an x-ray detector 22, and an x-ray detector controller 27 that contains electronics for operating the x-ray detector 22. During operation, x-rays 17 are directed from the x-ray source 15 towards the x-ray detector 22, which comprises a scintillator 80 and an amorphous silicon array 78 (which comprises photodiodes 41 and field effect transistors (FETs) 42). After passing through an object being imaged (i.e., a patient 19), the x-rays 17 fall upon scintillator 80, which converts the x-ray photons therein to visible light. The visible light is then converted to an electrical charge by the array of photodiodes 41 in the amorphous silicon array 78. Each photodiode 41 is of large enough area to ensure it will intercept a sizeable portion of the visible light produced by the scintillator 80. Each photodiode 41 also has a relatively large capacitance that allows it to store the electrical charge that results from the photon excitation. The electrical charge is then sent to an image processor 28, where the image signal is processed and enhanced. The processed image may then be displayed on a cathode ray tube display 32, or other suitable display, and/or the image can be stored in mass storage 30 for later retrieval. The image processor 28 can also produce a brightness control signal which can be applied to an exposure control circuit 34 to regulate the power supply 16, which can thereby regulate the x-ray source 15. The overall operation of the x-ray system may be governed by a system controller 36, which may receive commands from operator interface 38. Operator interface 38 may comprise a keyboard, touchpad, or other suitable input device. An associated cathode ray tube display 32 (or other suitable display) may allow the operator to view the reconstructed image and other data from the image processor 28. The operator supplied commands and parameters may be used by the system controller 36 to provide control signals and information to the image processor 28, the x-ray detector controller 27, and/or the exposure control circuit 34.

Embodiments of the present invention may make use of software or firmware running on the system controller 36 to carry out the processing of data in the methods and systems of this invention. A mouse, pointing device, or other suitable input device may be employed to facilitate the entry of data and/or image locations. Other embodiments of this invention may utilize a general purpose computer or workstation having a memory and/or printing capability for storing or printing images. Suitable memory devices are well known and include, but are not limited to, RAM, diskettes, hard drives, optical media, etc. Embodiments using stand-alone computers or workstations may receive data therefrom via conventional electronic storage media and/or via a conventional communications link, and images may then be reconstructed therefrom.

Generally, for medical applications, cesium iodide doped with about 0.05 to about 10 weight percent thallium is often used as the scintillator material. However, any suitable phosphorescent material that produces flashes of light when struck by particles or photons may be used as the scintillator material. For example, the scintillators may comprise inorganic materials such as: cesium iodide, cesium iodide doped with thallium, cesium iodide doped with sodium, sodium iodide, sodium iodide dope with thallium, lithium iodide, lithium iodide doped with europium, zinc sulphide, zinc sulphide doped with silver, calcium fluoride, calcium fluoride doped with europium, bismuth germinate, and cesium fluoride. The scintillators may also comprise organic crystals such as anthracene or stelbene, or glasses such as silicate glasses containing lithium activated with cerium.

Any suitable method of optically coupling the scintillator material to the amorphous silicon array can be used. Generally, the scintillator material is deposited, or grown, directly on the amorphous silicon array via chemical vapor deposition. Chemical vapor deposition generally involves utilizing a vacuum system and heating the scintillator material to a high temperature to liquefy it. Thereafter, vapor comes off the liquid and settles onto the surface of the comparatively cold amorphous silicon array on the glass substrate. In this manner, needles of cesium iodide can be grown directly on the amorphous silicon array on the scintillator device. The cesium iodide forms a layer of needles about 0.1 to about 1.0 mm thick on the device.

Each needle is typically several microns in diameter (i.e., about 5–10 $\mu$m) and several hundred microns long (i.e., about 100–1000 $\mu$m). Having such an aspect ratio, where the needles have a relatively long length compared to a relatively short diameter, allows most, but not all, of the visible light that is created by the scintillator to emerge from the bottom of the scintillator and be directed towards the corresponding pixel on the amorphous silicon array directly underlying the location where the incident radiation was absorbed by the scintillator. In uncoated needles, a significant amount of light can be lost due to light scattering at the needles' interface with the ambient environment, and therefore, that portion of the light that is lost will not reach the amorphous silicon array. Coating the needles with a reflective coating, both on top of the needles and along the edges or sides thereof, prevents the light from scattering out from the needles, thereby allowing more of the light to reach the amorphous silicon array.

During operation, transport or storage, these scintillators can be exposed to harsh, adverse environmental conditions, such as moisture, gases, extreme temperature variations, contamination, etc., which can potentially result in damage to the scintillators. Therefore, these scintillators generally comprise a barrier coating thereon that acts as a protective layer to prevent the scintillator from deteriorating when exposed to such ambient conditions. Members of the xylylene polymer family (i.e., Parylene-C, Parylene-N and Parylene-D) are commonly used as protective layers in scintillators.

Parylene is a conformal protective polymer coating material that has superior corrosion resistance and dielectric protection, and that can be used to uniformly protect various component configurations on a variety of substrates. Because of its unique properties, Parylene conforms to virtually any shape, including flat surfaces, sharp edges, and even crevices. Generally, Parylene is applied via specialized vacuum deposition equipment at ambient temperatures. The Parylene, in dimer form, is converted under heat and vacuum to a dimeric gas, which is then pyrolized to cleave the dimer, and then the results thereof are deposited, in a substantially conformal manner, as a clear, transparent, optical quality polymer film on the scintillator needles. While Parylene is an effective protective barrier coating, it has no reflective properties.

Key performance characteristics of radiation imaging devices, such as the modulation transfer function (MTF), the conversion factor (CF), and the detective quantum efficiency (DQE), are greatly dependent upon the light conduction and transmission efficiency of the scintillator. Light scattering at the interface of the needles with the atmosphere surrounding the needles can lead to a significant reduction in the device performance. Ideally, you want the x-ray photons that strike the scintillators to be converted to visible light therein, and be directed out towards the corresponding pixels on the amorphous silicon array therebelow, without losing a significant amount of light along the way. The needle-like shape of the scintillator material itself helps, by tending to collimate the light towards the corresponding pixels on the amorphous silicon array disposed therebelow. Additionally, a reflective layer is commonly used to reflect the light back into the needles and prevent it from scattering out therefrom, thereby improving the light conduction and transmission efficiency of the scintillator. In existing scintillators, this reflective layer is a layer that is placed only over the top of the needles; it does not cover the sides of the needles and therefore, light can scatter out from the sides of the needles. In this invention, the reflective layer is deposited in a substantially conformal manner all around the needles, both on top and on the sides, thereby allowing more light to be reflected back into the needles.

As described above, existing scintillators utilize a barrier coating or protective layer on the scintillator material, and then utilize a separate reflective layer over, above, or on top of, the scintillator material. This invention combines the protective layer with the reflective layer, using a single layer or coating on the scintillator material to act as both a protector and a reflector. Additionally, this invention deposits this single layer or coating all around the scintillator needles, not just on top of them, as shown in FIG. 3.

Referring now to FIG. 3, there is shown a schematic drawing showing cesium iodide needles coated with a protective/reflective coating, as utilized in embodiments of this invention. As shown, an amorphous silicon array 78 is disposed on a glass substrate 76. The scintillator needles 90 are then grown on the amorphous silicon array 78. Thereafter, a protective/reflective coating 92 is deposited to cover the needles, both the tops of the needles 90 and along at least a portion of the edges thereof. As shown herein, the protective/reflective coating 92 generally forms an essentially solid uninterrupted layer on top of the needles, while leaving space 94 in between the needles. This protective/reflective coating 92 allows much more light to be reflected back into the scintillator needles 90, thereby improving the performance of the device these scintillators are used in.

In embodiments, Parylene may be used to form the combination protection/reflection layer 92 on the scintillator material. In embodiments, the Parylene may be modified as necessary so as to also have reflective properties, in addition to its existing protective properties. In other embodiments, the Parylene may be co-deposited with another material that has reflective properties, so that, together, the two materials form a combination protective/reflective layer 92 surrounding the scintillator needle material 90.

The Parylene may be modified so as to have reflective properties as well as protective properties by modifying the deposition conditions. Samples of Parylene film were deposited on glass substrates under the following exemplary conditions:

| Sample # | Deposition Pressure (Torr) | Sublimation Temperature (° C.) | Pyrolysis Temperature (° C.) | Deposition Rate ($\mu$m/hour) | Film Thickness ($\mu$m) |
|---|---|---|---|---|---|
| 1 | 0.4–0.5 | 120–125 | 680 | 0.3 | 4 |
| 2 | 0.7–0.8 | 127–132 | 680 | 0.9 | 10 |

Sample #2, which was deposited at higher pressure and deposition rates, produced a film that was opaque white in color, while sample #1, which was deposited at lower pressure and deposition rates, produced a film that was transparent. Therefore, Parylene deposited under the conditions of sample #2 could be used by itself to act as a combination protective/reflective layer on scintillator materials. There are also numerous other conditions under which predetermined materials could be deposited in order to produce the desired protective/reflective layer on scintillator materials. Additionally, there are numerous other materials that could be used instead of Parylene, such as organic polymers and/or silicon-based coatings.

Alternatively, the Parylene, or other suitable material, may be co-deposited, via a method such as chemical vapor deposition (CVD), metal organic chemical vapor deposition (MOCVD) or the like, with a reflective material such as, but not limited to, metals, metal oxides, or other metallic compounds that naturally form mirror-like surfaces. These metals, metallic oxides, and metallic compounds may comprise any suitable metal, such as for example, one or more of the following metals: Ag, Al, Ti, Cr, Sn, Zr, Au, Mo, etc. Co-depositing these materials yields a highly reflective layer 92 on top of and around the scintillator needles 90, while preserving the protective properties of the Parylene. This layer 92 reflects the light back into the needles 90, thereby improving the light transmission of the needles by minimizing the light that scatters out therefrom.

The scintillators described herein may be used in numerous radiation imaging applications, such as, but not limited to, medical imaging (i.e., x-ray, computed tomography, volume computed tomography, etc.), nondestructive imaging and/or testing of parts, and for detecting contraband (i.e., weapons, explosives, etc.).

As described above, this invention provides a scintillator having an improved protective barrier coating 92, wherein the protective barrier coating also has light transmission and light reflection properties, all in a single coating. Advantageously, this invention utilizes a combination of protective and light transmissive and reflective materials in a single coating so as to minimize the processing steps that are required to manufacture these scintillators, which can ideally be utilized in radiation imaging systems. This invention may comprise a protective barrier coating that has been modified to also comprise light transmissive and light reflective properties. This invention may also comprise co-depositing a protective barrier coating with a light transmissive/reflective coating. The scintillator coatings of this invention allow improved scintillators to be produced, which can consequently improve the performance of the radiation imaging devices they are utilized in. Many other advantages will also be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while the embodiments shown and described herein are commonly utilized in medical imaging, this invention may be utilized for other types of radiation imaging without deviating from the spirit and scope of this invention, and all such variations are intended to be covered herein. Furthermore, while cesium iodide needles have been described herein, any suitable phosphorescent material that produces flashes of light when struck by particles or photons may be used. Additionally, while Parylene coatings have been described herein, other suitable materials may be used in these coatings. Thus, it is intended that the present invention cover all suitable modifications and variations as come within the scope of the appended claims and their equivalents.

What is claimed is:

1. A scintillator comprising:
 a scintillator material comprising a single-layer barrier coating disposed thereon, wherein the barrier coating: (1) provides barrier protection to the scintillator material, (2) is capable of transmitting light therethrough, and (3) is capable of reflecting light back into the scintillator material, and wherein the barrier coating is disposed on top portions and interstitially on partial side portions of the scintillator material, the barrier coating defining one or more voids adjacent to other partial side portions of the scintillator material.

2. The scintillator of claim 1, wherein the barrier coating comprises a material that has been modified to have light transmissive and reflective properties in addition to protective properties.

3. The scintillator of claim 2, wherein the material comprises Parylene.

4. The scintillator of claim 1, wherein the barrier coating comprises a protective material and a reflective material that have been co-deposited onto the scintillator material.

5. The scintillator of claim 4, wherein the protective material comprises Parylene.

6. The scintillator of claim 4, wherein the reflective material comprises a light reflective material that can be co-deposited with Parylene.

7. The scintillator of claim 4, wherein the reflective material comprises at least one of: a metal, a metal compound, a metal oxide, and a metal halide.

8. The scintillator of claim 1, wherein the scintillator material comprises at least one of: cesium iodide, cesium iodide doped with thallium, cesium iodide doped with sodium, sodium iodide, sodium iodide dope with thallium, lithium iodide, lithium iodide doped with europium, zinc sulphide, zinc sulphide doped with silver, calcium fluoride, calcium fluoride doped with europium, bismuth germinate, cesium fluoride, anthracene, stelbene, and a silicate glass containing lithium activated with cerium.

9. The scintillator of claim 1, wherein the barrier coating is a single coating overlying the scintillator material.

10. The scintillator of claim 1, wherein the barrier coating is disposed in a substantially conformal manner on the scintillator material.

11. The scintillator of claim 1, wherein the barrier coating is applied overlying the scintillator material via at least one of: chemical vapor deposition, metal organic chemical vapor deposition, thermal evaporation, electron beam evaporation, molecular beam evaporation, and sputtering.

12. The scintillator of claim 1, wherein the scintillator is used for at least one of: medical imaging, nondestructive testing of parts, and detecting contraband.

13. A scintillator comprising a single-layer coating thereon that protects the scintillator from ambient conditions, transmits light therethrough, and reflects light back into the scintillator, wherein the coating is disposed on top portions and interstitially on partial side portions of the scintillator, the barrier coating defining one or more voids adjacent to other partial side portions of the scintillator.

14. The scintillator of claim 13, wherein the coating comprises at least one of Parylene, Parylene-N, Parylene-C, Parylene-D, a metal, a metal compound, a metal oxide, and a metal halide.

15. The scintillator of claim 13, wherein the coating is a single layer overlying the scintillator.

16. The scintillator of claim 13, wherein the coating is disposed in a substantially conformal manner on the scintillator.

17. The scintillator of claim 13, wherein the scintillator is used for at least one of: medical imaging, nondestmctive testing of parts, and detecting contraband.

18. A radiation imaging system comprising:
   an x-ray source;
   an x-ray detector comprising:
      a scintillator comprising:
         a scintillator material comprising a single-layer barrier coating disposed thereon, wherein the barrier coating: (1) provides barrier protection to the scintillator material, (2) is capable of transmitting light therethrough, and (3) is capable of reflecting light back into the scintillator material, and wherein the barrier coating is disposed on top portions and interstitially on partial side portions of the scintillator material, the barrier coating defining one or more voids adjacent to other partial side portions of the scintillator material; and
         an amorphous silicon array optically coupled to the scintillator;
      wherein the x-ray source is capable of projecting a beam of x-rays towards the x-ray detector, the x-ray detector is capable of detecting the x-rays, and an image can be created therefrom.

19. A method for making a scintillator having a single-layer barrier coating thereon that has both protective properties and light reflective and light transmissive properties, the method comprising:
   disposing an amorphous silicon array on a detector substrate;
   disposing a scintillator material on the amorphous silicon array;
   forming a single-layer barrier coating on the scintillator material;
   wherein the barrier coating: (1) provides barrier protection to the scintillator material, (2) is capable of transmitting light therethrough, and (3) is capable of reflecting light back into the scintillator material, and wherein the barrier coating is disposed on top portions and interstitially on partial side portions of the scintillator material, the barrier coating defining one or more voids adjacent to other partial side portions of the scintillator material.

20. The method of claim 19, wherein disposing the scintillator material on the amorphous silicon array comprises growing the scintillator material directly on the amorphous silicon array.

21. The method of claim 19, wherein forming the barrier coating on the scintillator material comprises depositing the barrier coating onto the scintillator material via at least one of: chemical vapor deposition, metal organic chemical vapor deposition, thermal evaporation, electron beam evaporation, molecular beam evaporation, and sputtering.

22. The method of claim 21, wherein the barrier coating is deposited onto the scintillator material in a substantially conformal manner.

* * * * *